(12) United States Patent
Mohammadi

(10) Patent No.: US 11,506,251 B2
(45) Date of Patent: Nov. 22, 2022

(54) BASE MEMBER FOR A DAMPER

(71) Applicant: DRiV Automotive Inc., Lake Forest, IL (US)

(72) Inventor: Amirahmad Mohammadi, Heverlee (BE)

(73) Assignee: DRiV Automotive Inc., Lake Forest, IL (US)

( * ) Notice: Subject to any disclaimer, the term of this patent is extended or adjusted under 35 U.S.C. 154(b) by 237 days.

(21) Appl. No.: 16/577,260

(22) Filed: Sep. 20, 2019

(65) Prior Publication Data

US 2021/0088097 A1 Mar. 25, 2021

(51) Int. Cl.
| | |
|---|---|
| *F16F 9/54* | (2006.01) |
| *F16F 9/32* | (2006.01) |
| *F16F 9/18* | (2006.01) |
| *F16F 9/19* | (2006.01) |
| *F16F 9/43* | (2006.01) |
| *B60G 13/06* | (2006.01) |
| *F16F 9/06* | (2006.01) |

(52) U.S. Cl.
CPC ............ *F16F 9/3242* (2013.01); *B60G 13/06* (2013.01); *F16F 9/185* (2013.01); *F16F 9/19* (2013.01); *F16F 9/3257* (2013.01); *F16F 9/3271* (2013.01); *F16F 9/43* (2013.01); *F16F 9/54* (2013.01); *B60G 2202/24* (2013.01); *B60G 2204/129* (2013.01); *B60G 2204/4304* (2013.01); *B60G 2206/41* (2013.01); *B60G 2206/50* (2013.01); *F16F 9/062* (2013.01); *F16F 9/065* (2013.01); *F16F 2222/12* (2013.01); *F16F 2226/04* (2013.01); *F16F 2226/042* (2013.01); *F16F 2226/045* (2013.01); *F16F 2226/048* (2013.01); *F16F 2230/0005* (2013.01); *F16F 2230/06* (2013.01)

(58) Field of Classification Search
CPC ........ F16F 9/3242; F16F 9/325; F16F 9/3257; F16F 9/43; F16F 9/185; B60G 13/006; B60G 13/008; B60G 13/06; B60G 13/3271
USPC ....... 188/315, 322.13, 322.14, 322.19, 322.2
See application file for complete search history.

(56) References Cited

U.S. PATENT DOCUMENTS

| | | | |
|---|---|---|---|
| 3,843,107 A | 10/1974 | Atkins | |
| 4,441,593 A * | 4/1984 | Axthammer | B60G 15/062 188/322.19 |

(Continued)

FOREIGN PATENT DOCUMENTS

| | | |
|---|---|---|
| DE | 4312045 A1 | 10/1994 |
| DE | 19516383 A1 | 11/1996 |

(Continued)

*Primary Examiner* — Christopher P Schwartz
(74) *Attorney, Agent, or Firm* — McGarry Bair PC

(57) ABSTRACT

A damper includes a damper tube (a pressure tube or a reserve tube for a mono-tube or a double tube damper respectively) including a first end and a second end opposite to the first end. The damper includes a base member. The base member includes a cup portion at least partially enclosing the first end of the damper tube, and a sleeve portion extending from and integral with the cup portion. The sleeve portion surrounds a length of the damper tube. The sleeve portion is attached to the damper tube. Further, the damper includes a knuckle engaged with the sleeve portion such that the sleeve portion is disposed between the knuckle and the damper tube.

18 Claims, 13 Drawing Sheets

(56) References Cited

U.S. PATENT DOCUMENTS

| | | | |
|---|---|---|---|
| 4,988,082 A * | 1/1991 | Pees | B29D 22/02 |
| | | | 267/122 |
| 9,334,918 B2 | 5/2016 | Ackermann et al. | |
| 2006/0042895 A1 | 3/2006 | Mangelschots et al. | |
| 2014/0318908 A1 * | 10/2014 | Kazmirski | F16F 9/512 |
| | | | 188/280 |
| 2015/0330475 A1 * | 11/2015 | Slusarczyk | F16F 9/49 |
| | | | 188/288 |
| 2015/0354661 A1 * | 12/2015 | Pradel | F16F 9/3242 |
| | | | 403/270 |
| 2018/0202508 A1 * | 7/2018 | Munteanu | F16F 9/369 |
| 2018/0274622 A1 | 9/2018 | Iordanov et al. | |
| 2020/0148301 A1 * | 5/2020 | Ishihara | B62K 25/08 |

FOREIGN PATENT DOCUMENTS

| | | |
|---|---|---|
| DE | 102008032724 A1 | 2/2010 |
| DE | 102010024365 A1 | 4/2011 |
| DE | 102014220720 A1 | 4/2016 |

* cited by examiner

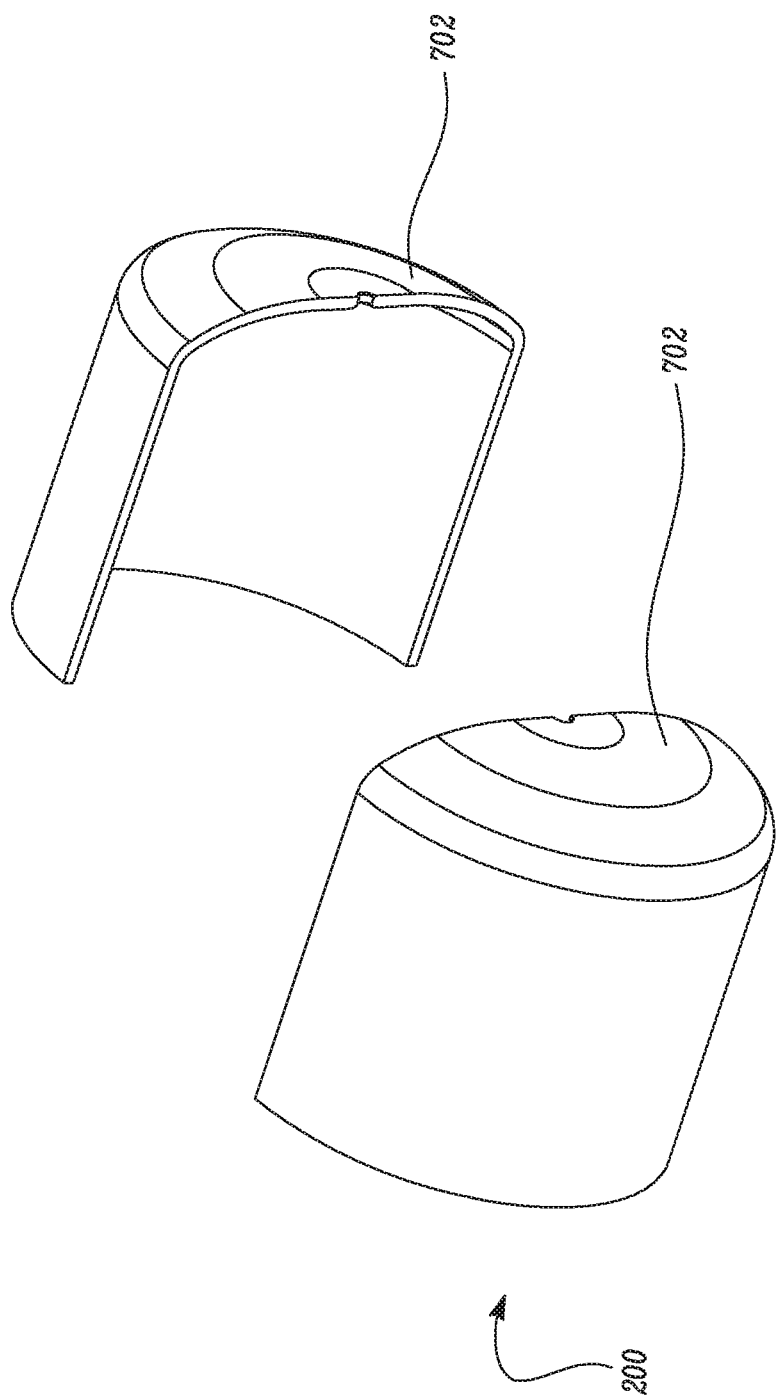

BASE MEMBER FOR A DAMPER

TECHNICAL FIELD

The present disclosure generally relates to dampers. More particularly, the present disclosure relates to a base member for dampers.

BACKGROUND

Shock absorbers/dampers are generally installed on different types of equipment, such as vehicles, to dampen vibrations during operation. For example, dampers are generally connected between a body and the suspension system of the vehicle in order to absorb the vibrations. There are different types of dampers, for example, mono-tube dampers and double-tube dampers. Conventional mono-tube dampers typically include a pressure tube, a piston and a piston rod. The mono-tube dampers include a floating piston to compensate for the volume of the piston rod. During a compression stroke and a rebound stroke of the damper, the piston can limit a flow of damping fluid between working chambers defined within the pressure tube due to which the damper produces a damping force for counteracting the vibrations. Conventional double-tube dampers typically include a reserve tube disposed around the pressure tube, and one or more additional valves.

Various types of corner assemblies for suspension are known for vehicles. Some corner assemblies include a strut assembly which includes a yoke where an outer tube (the pressure tube for the mono-tube dampers and the reserve tube for the double tube dampers) of the damper is clamped by the yoke which is attached to a lower control arm, a knuckle or another component of the corner assembly. This typically requires some reinforcement of the clamped area of the outer tube to meet the clamping load requirements, while the unclamped area of the outer tube does not have these requirements.

Typically, the outer tube of the damper is designed as a constant wall thickness tube. However, the thickness of the tube can be designed to meet the clamping load requirements, but this can lead to over designing of the unclamped area of the damper which do not have such clamping load requirements. This can lead to material wastage and high costs. Further, the option of designing a single piece variable thickness outer tube seems to be infeasible due to the high cost and complications involved. So, there is a need to provide reinforcement to the clamped area of the outer tube but without involving high costs and manufacturing complications and other issues of the conventional setups.

SUMMARY

In an aspect of the present disclosure, a damper is provided. The damper includes a damper tube including a first end and a second end opposite to the first end. The damper includes a base member. The base member includes a cup portion at least partially enclosing the first end of the damper tube, and a sleeve portion extending from and integral with the cup portion. The sleeve portion surrounds a length of the damper tube. The sleeve portion is attached to the damper tube. Further, the damper includes a knuckle engaged with the sleeve portion such that the sleeve portion is disposed between the knuckle and the damper tube.

In another aspect of the present disclosure, a damper is provided. The damper includes a pressure tube including a first end and a second end opposite to the first end. The damper includes a piston assembly slidably received within the pressure tube. The damper includes a base member. The base member includes a cup portion at least partially enclosing the first end of the pressure tube, and a sleeve portion extending from and integral with the cup portion. The sleeve portion surrounds a length of the pressure tube. The sleeve portion is attached to the pressure tube. Further, the damper includes a knuckle engaged with the sleeve portion such that the sleeve portion is disposed between the knuckle and the pressure tube.

In yet another aspect of the present disclosure, a damper is provided. The damper includes a pressure tube. The damper includes a piston assembly slidably received within the pressure tube. The damper includes a base valve disposed at an end of the pressure tube. The damper includes a reserve tube disposed around the pressure tube. The reserve tube including a first end proximate the base valve and a second end distal to the base valve. The damper includes a base member. The base member includes a cup portion at least partially enclosing the first end of the reserve tube, and a sleeve portion extending from and integral with the cup portion. The sleeve portion surrounds a length of the reserve tube. The sleeve portion is attached to the reserve tube. Further, the damper includes a knuckle engaged with the sleeve portion such that the sleeve portion is disposed between the knuckle and the reserve tube.

Other features and aspects of this disclosure will be apparent from the following description and the accompanying drawings.

BRIEF DESCRIPTION OF DRAWINGS

FIG. 7 is an illustration of half-shells which are joined to form the base member, according to an aspect of the present disclosure;

DETAILED DESCRIPTION

Wherever possible, the same reference numbers will be used throughout the drawings to refer to same or like parts.

Aspects of the disclosure generally relate to a base member for a damper. The base member includes a cup portion at least partially enclosing an end of a damper tube of the damper. Further, the base member includes a sleeve portion extending from and integral with the cup portion. This integrated design of the base member allows the sleeve portion to surround a length of the damper tube. Moreover, a knuckle engages with the sleeve portion such the sleeve portion is disposed between the damper tube and the knuckle. Effectively, the presence of the sleeve portion of the base member serves to meet the clamping load requirements for the area clamped by the knuckle. Also, the cup portion serves to effectively close the end of the damper tube, while retaining an option of gas filling for mono-tube dampers and accommodating a base valve for double-tube dampers.

Figure 1:
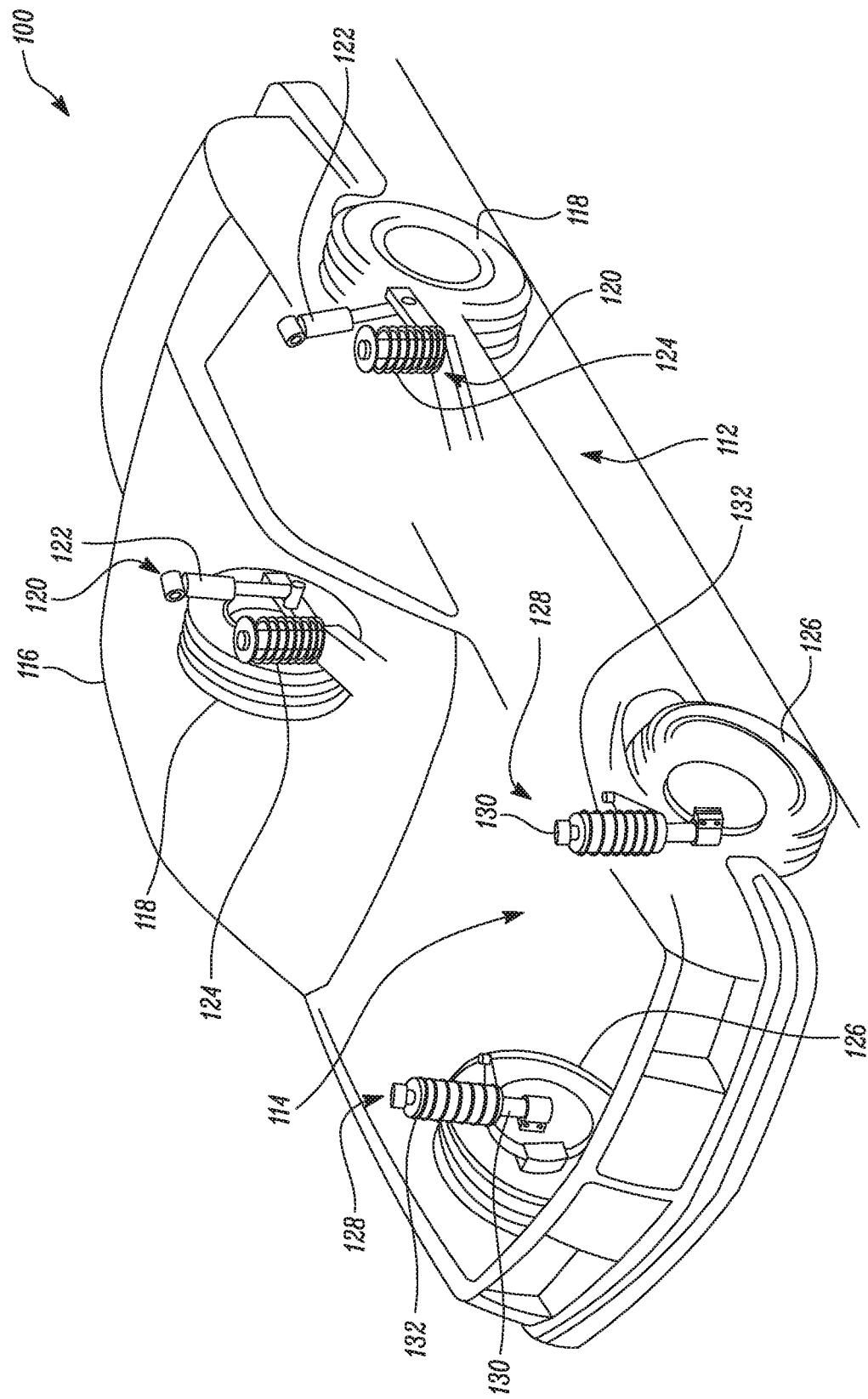
FIG. 1 is an illustration of a vehicle incorporating a suspension system, according to an aspect of the present disclosure.

FIG. 1 illustrates an exemplary vehicle 100 incorporating a suspension system having a corner assembly in accordance with the present disclosure. The vehicle 100 includes a rear suspension 112, a front suspension 114 and a body 116. The rear suspension 112 has a transversely extending rear axle assembly (not shown) adapted to operatively support rear wheels 118 of the vehicle 100. The rear axle assembly is operatively connected to the body 116 by means of a pair of corner assemblies 120 which include a pair of dampers 122 and a pair of coil springs 124. Similarly, the front suspension 114 includes a transversely extending front axle assembly (not shown) to operatively support front wheels 126 of the vehicle 100. The front axle assembly is operatively connected to the body 116 by means of a second pair of corner assemblies 128 which include a pair of dampers 130 and a pair of coil springs 132. The dampers 122 and 130 serve to dampen the relative motion of the unsprung portion (i.e. the front and rear suspensions 112 and 114, respectively) and the sprung portion (i.e. the body 116) of the vehicle 100. While the vehicle 100 has been depicted as a passenger car having front and rear axle assemblies, the dampers 122 and 130 can be used with other types of vehicles and/or in other types of applications such as vehicles incorporating independent front and/or independent rear suspension systems. Further, the term "damper" as used herein is meant to be dampers in general and thus will include struts. Also, while the front suspension 114 is illustrated having a pair of struts or dampers 130, it is within the scope of the present disclosure to have the rear suspension 112 incorporate a pair of struts or dampers 130 if desired.

Figure 2:
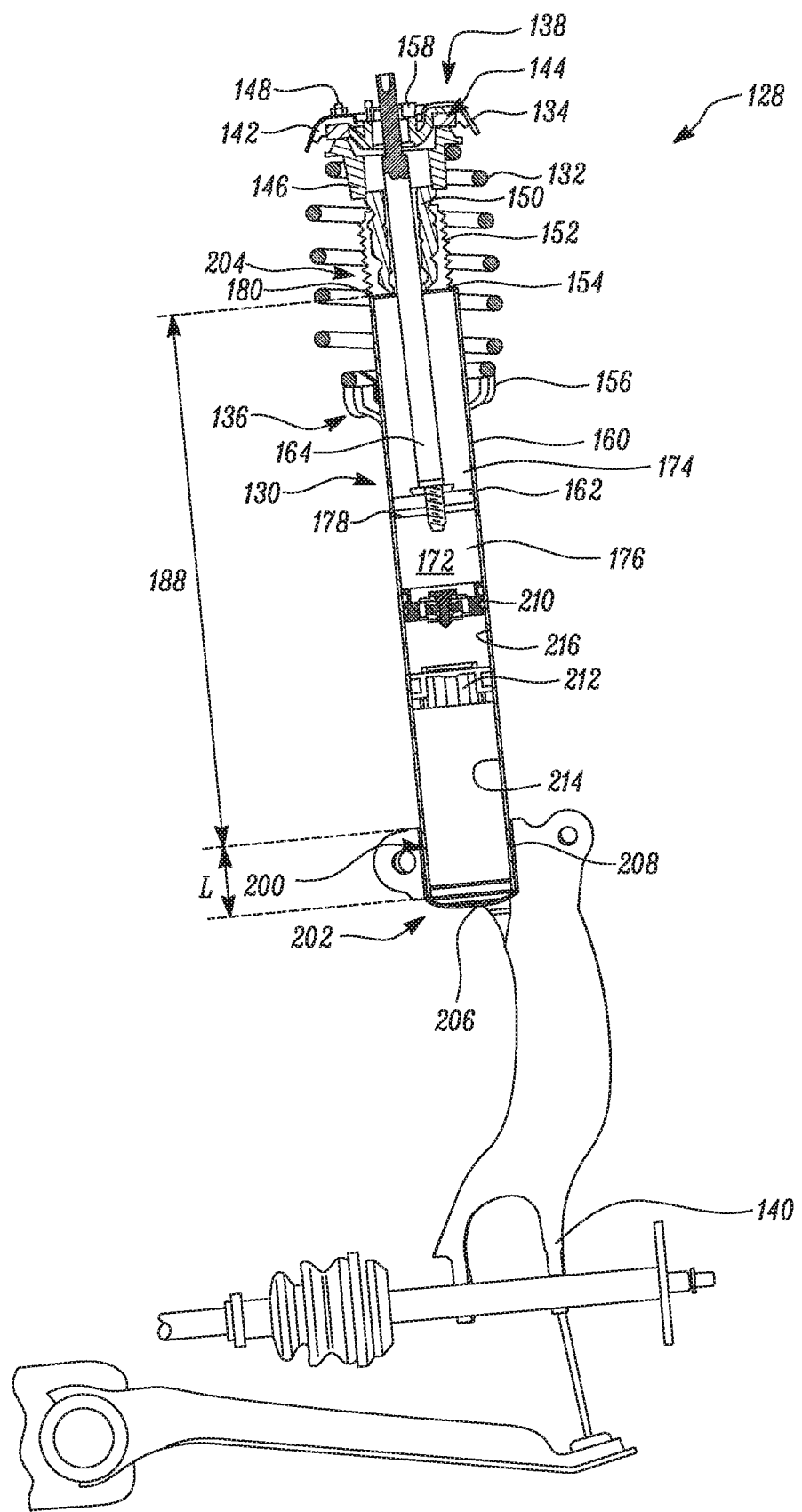
FIG. 2 is a schematic illustration of a corner assembly that incorporates a mono-tube damper associated with the suspension system of FIG. 1, according to an aspect of the present disclosure.

Referring now to FIG. 2, the corner assembly 128 for the vehicle 100 is illustrated in greater detail. The body 116 defines a shock tower 134 including sheet metal of the vehicle 100 within which is mounted a strut assembly 136 which includes a telescoping device in the form of the damper 130, the coil spring 132, a top mount assembly 138 and a knuckle 140. The strut assembly 136 includes the damper 130, the coil spring 132 and the top mount assembly 138 which are attached to the vehicle 100 using the shock tower 134. The top mount assembly 138 includes a top mount 142, a bearing assembly 144 and an upper spring seat 146. The top mount 142 can include an integral molded body and a rigid body member, typically made of stamped steel. The top mount assembly 138 is mounted to the shock tower 134 by bolts 148. The bearing assembly 144 can be friction fit within the molded body of the top mount 142 to be seated in the top mount 142 so that one side of the bearing assembly 144 is fixed relative to the top mount 142 and the shock tower 134. The second side of the bearing assembly 144 freely rotates with respect to the first side of the bearing assembly 144, the top mount 142 and the shock tower 134.

The free rotating side of the bearing assembly 144 carries the upper spring seat 146 that can be clearance fit to the outer diameter of the bearing assembly 144. A jounce bumper 150 is disposed between the upper spring seat 146 and the damper 130. The jounce bumper 150 includes an elastomeric material which is protected by a plastic dirt shield 152. A bumper cap 154 is located on the damper 130 to interface with the jounce bumper 150 and the plastic dirt shield 152.

A lower spring seat 156 is attached to the damper 130 and the coil spring 132 is disposed between the upper spring seat 146 and the lower spring seat 156 to isolate the body 116 from the front suspension 114 (shown in FIG. 1). While the damper 130 is illustrated in FIG. 2, it is to be understood that the damper 122 can also include the features described herein for the damper 130.

Prior to the assembly of the strut assembly 136 into the vehicle 100, the pre-assembly of the strut assembly 136 is performed. The bumper cap 154, the jounce bumper 150 and the plastic dirt shield 152 are assembled to the damper 130. The coil spring 132 is assembled over the damper 130 and positioned within the lower spring seat 156. The upper spring seat 146 is assembled onto the damper 130 and correctly positioned with respect to the coil spring 132. The bearing assembly 144 is positioned on top of the upper spring seat 146 and the top mount 142 is positioned on top of the bearing assembly 144. This entire assembly is positioned within an assembly machine which compresses the coil spring 132 such that the end of the damper 130 extends through a bore located within the top mount assembly 138. A retaining nut 158 is threadingly received on the end of the damper 130 to secure the assembly of the strut assembly 136.

The top mount 142 is designed as an identical component for the right- and left-hand sides of the vehicle 100 but it has a different orientation with respect to the damper 130 and its associated bracketry when it is placed on the right or left side of the vehicle 100.

While FIG. 2 illustrates only the damper 130, it is to be understood that the damper 122 can also be a part of a strut assembly and include the reinforcement described below for the damper 130. The damper 130 includes a pressure tube 160, a piston assembly 162, a piston rod 164, a fixed valve assembly 210 and a floating piston 212. In the illustrated embodiment of FIG. 2, the pressure tube 160 is the damper tube that may require reinforcement.

It is to be understood that for the purposes of the present disclosure, a damper tube can be a pressure tube for mono-tube dampers, since the pressure tube engages with the knuckle in case of mono-tube dampers and may require reinforcement. Similarly, the damper tube can be a reserve tube for double-tube dampers, since the reserve tube at least partially surrounds the pressure tube of double-tube dampers, and the reserve tube may require reinforcement.

The pressure tube 160 defines a working chamber 172. The piston assembly 162 is slidably disposed within the pressure tube 160 and divides the working chamber 172 into an upper working chamber 174 and a lower working chamber 176. A seal 178 is disposed between the piston assembly 162 and the pressure tube 160 to permit sliding movement of the piston assembly 162 with respect to the pressure tube 160 without generating undue frictional forces as well as sealing the upper working chamber 174 from the lower working chamber 176. The piston rod 164 is attached to the piston assembly 162 and extends through the upper working chamber 174 and through an upper end cap 180 which closes the upper end of the pressure tube 160. A sealing system seals the interface between the upper end cap 180, the pressure tube 160 and the piston rod 164. The end of the piston rod 164 opposite to the piston assembly 162 is adapted to be secured to the top mount assembly 138 and to the sprung portion of the vehicle 100 as discussed above. Valving within the piston assembly 162 controls the movement of fluid between the upper working chamber 174 and the lower working chamber 176 during movement of the piston assembly 162 within the pressure tube 160. Because the piston rod 164 extends only through the upper working chamber 174 and not the lower working chamber 176, movement of the piston assembly 162 with respect to the pressure tube 160 causes a difference in the amount of fluid displaced in the upper working chamber 174 and the amount of fluid displaced in the lower working chamber 176. The difference in the amount of fluid displaced is known as the "rod volume".

The fixed valve assembly 210 is fixedly mounted to the pressure tube 160 between the piston assembly 162 and the floating piston 212. Between the floating piston 212 and a first end 202 of the pressure tube 160 is defined a gas chamber 214. The gas chamber 214 can include air or any suitable gas, such as nitrogen. Between the fixed valve assembly 210 and the floating piston 212 defines a compensation chamber 216.

Figure 3A:
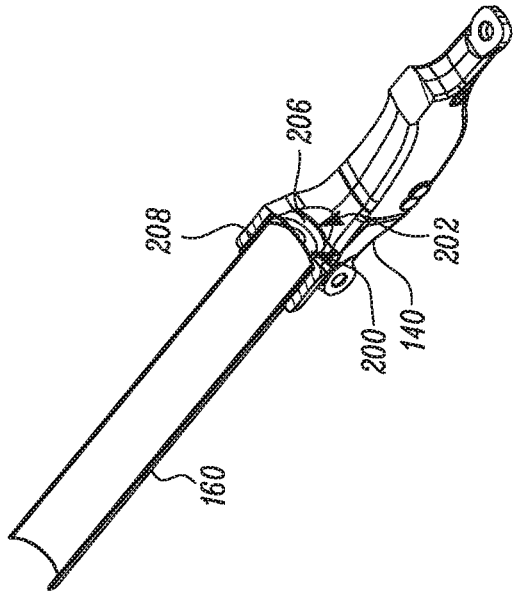
FIG. 3A is a perspective illustration of a pressure tube and a base member of the damper shown in FIG. 2, according to an aspect of the present disclosure.
Figure 3B:
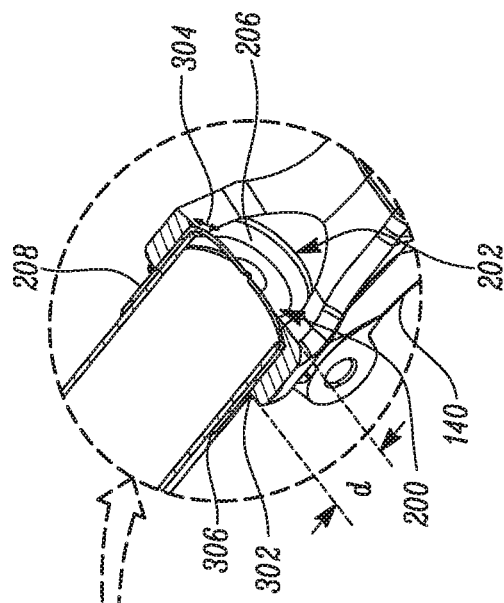
FIG. 3B is a sectional illustration of the pressure tube and the base member of the damper shown in FIG. 3A, according to an aspect of the present disclosure.
Figure 4:
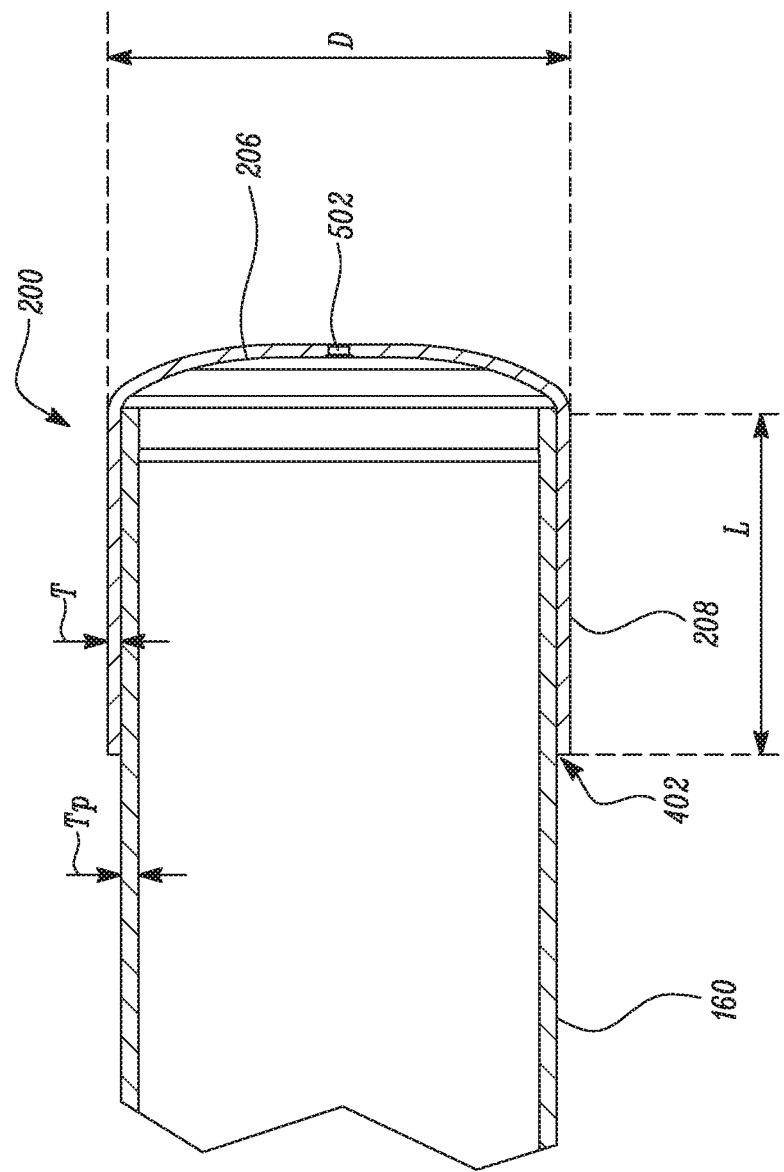
FIG. 4 is a sectional illustration around a first end of the pressure tube of the damper shown in FIG. 3A, according to another aspect of the present disclosure.

The damper 130 has the pressure tube 160 having the first end 202 and a second end 204 opposite to the first end 202. The damper 130 includes a base member 200. The base member 200 includes a cup portion 206 at least partially enclosing the first end 202 of the pressure tube 160, and a sleeve portion 208 extending from and integral with the cup portion 206. The sleeve portion 208 surrounds a length L (alternatively, a reinforced portion L) of the pressure tube 160. The sleeve portion 208 is attached to the pressure tube 160. Further, as illustrated in FIGS. 3A, and 3B the damper 130 includes the knuckle 140 engaged with the sleeve portion 208 such that the sleeve portion 208 is disposed between the knuckle 140 and the pressure tube 160. The base member 200 acts as a reinforcing means and closes the first end 202 of the pressure tube 160 as illustrated in FIG. 4. As evident, the length L of the sleeve portion 208 can depend upon multiple factors related to the pressure tube 160 and the knuckle 140, such as clamping load requirements, strength, material, type, or shape of any of the pressure tube 160 and the knuckle 140. Moreover, the length L of the sleeve portion 208 shall preferably be in accordance with the contact area between the knuckle 140 and the pressure tube 160.

Figure 3C:
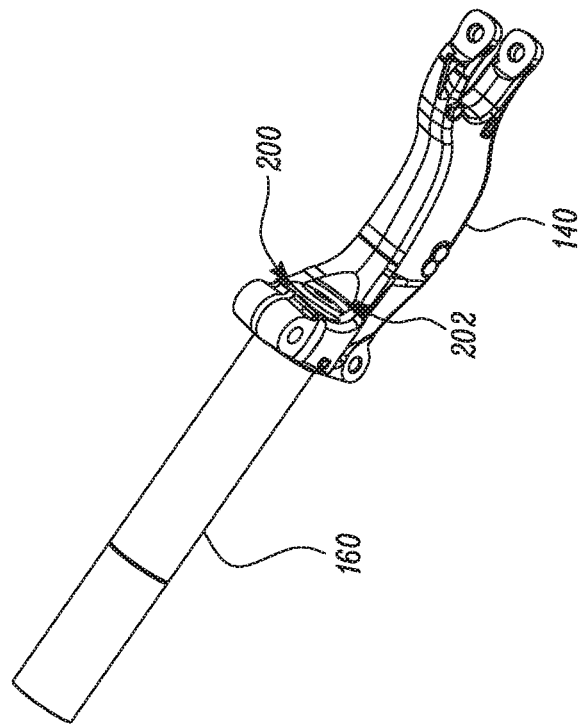
FIG. 3C is a sectional illustration of the pressure tube where the base member of the damper is welded to a knuckle, according to an aspect of the present disclosure.

FIG. 3C illustrates the pressure tube 160 where the base member 200 of the damper 130 is welded to the knuckle 140, according to an embodiment of the present disclosure. The base member 200 and the knuckle 140 are welded to each other around a weld region 302. As illustrated in the present embodiment, the weld region 302 can be an arc welded region and can be at a distance d from the cup portion 206 of the base member 200. In some embodiments, the distance d can be around 15 mm. The knuckle 140 only partially covers the sleeve portion 208 such that there is adequate room for the weld region 302. Moreover, this embodiment illustrates a contact area 304 between the base member 200 and the knuckle 140. More particularly, the contact area 304 can be around a machined region inside the knuckle 140 where the cup portion 206 of the base member 200 remains in contact with the knuckle 140. Moreover, the base member 200 and the pressure tube 160 are welded to each other around a weld region 306. In some embodiments, the weld region 306 can be a laser welded region. The weld region 302 and the weld region 306 of the present disclosure are exemplary in nature and any other joining or fabrication technique can be used for implementation of the present disclosure.

In an embodiment, the sleeve portion 208 is attached to the damper 130 by at least one of welding, press-fitting, crimping, and gluing, or any other attaching technique as known or used in the art. Furthermore, the sleeve portion 208 can be attached by laser welding around a welding zone 402 around a top of the sleeve portion 208 which is attached to the damper 130, as illustrated in FIG. 4. Further, the base member 200 includes a diameter D and the length L of the base member 200 which defines an engagement area of the base member 200 with the pressure tube 160 of the damper 130. Moreover, a thickness T of the base member 200 can be decided based upon different factors such as a thickness Tp of the pressure tube 160 of the damper 130. More particularly, the length L, the diameter D, and the thickness T of the base member 200 can depend upon clamping forces involved for coupling of the knuckle 140 with the sleeve portion 208 of the base member 200. Sleeve portion 208 can be substantially cylindrical, while the cup portion 206 can be partly spherical in shape.

Figure 5:
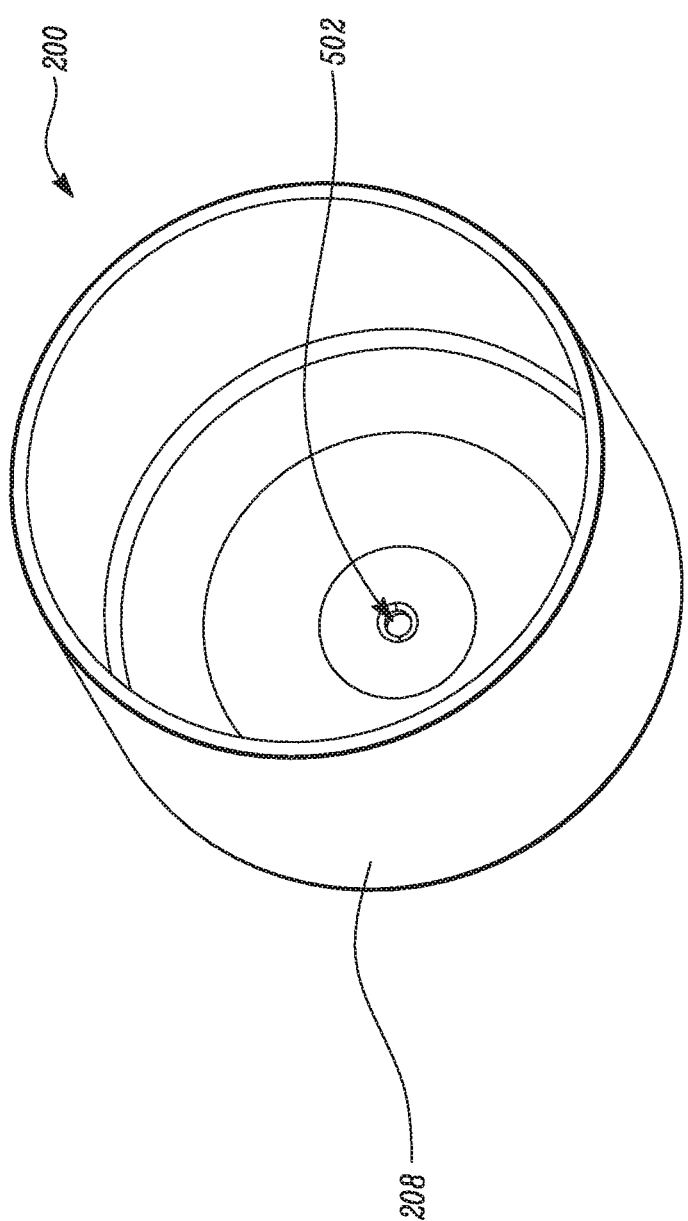
FIG. 5 is a perspective illustration of the base member, according to an aspect of the present disclosure.

FIG. 5 illustrates the base member 200, where the cup portion 206 of the base member 200 defines an aperture 502. The aperture 502 is typically provided for gas filling for the mono-tube dampers. Alternatively, the base member 200 can be made without the aperture 502 where gas filling is done from the top of the damper 130 or gas filling is not required, such as for applications involving the double-tube dampers.

In some embodiments, the sleeve portion 208 can have the thickness T of around 1.5 mm. The diameter D of the sleeve portion 208 of the base member 200 can be in the range of about 49 mm to 53 mm. Particularly, the diameter D of the base member 200 can be around 50 mm. These dimensions of the base member 200 are merely exemplary in nature and shall not be taken to be limiting on the present disclosure.

Figure 6:
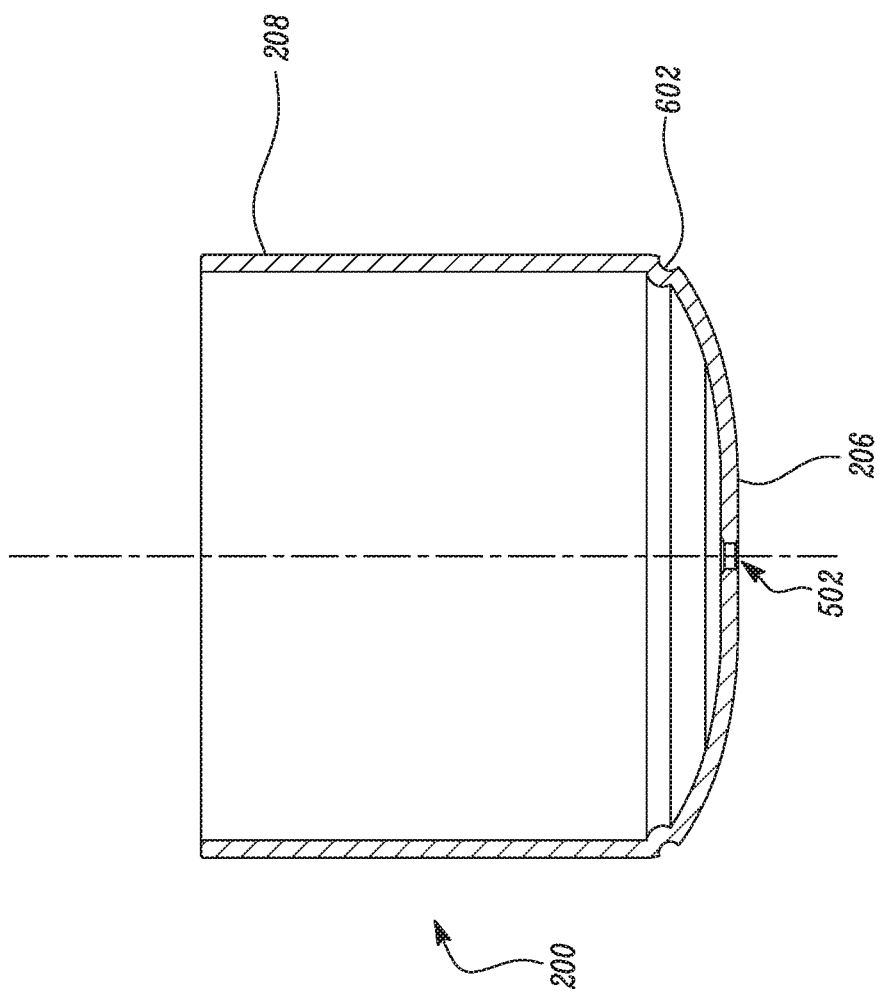
FIG. 6 is a sectional illustration of the base member, according to an aspect of the present disclosure.

FIG. 6 illustrates the base member 200 where the cup portion 206 defines a groove 602 disposed adjacent to the sleeve portion 208. The groove 602 of the cup portion 206 allows ease of assembly or press-fitting of the base member 200 with the knuckle 140. Presence of the groove 602 can also check any deformation of the cup portion 206 during/after assembly of the base member 200 with the knuckle 140. Moreover, the groove 602 can serve for supporting external components such as wires or brackets.

In an embodiment, the base member 200 includes a pair of half-shells 702 joined to each other as illustrated in FIG. 7. The half-shells 702 can be joined to each other to form the base member 200 through any joining method such as, but not limited to, welding, gluing, or brazing.

Figure 8A:
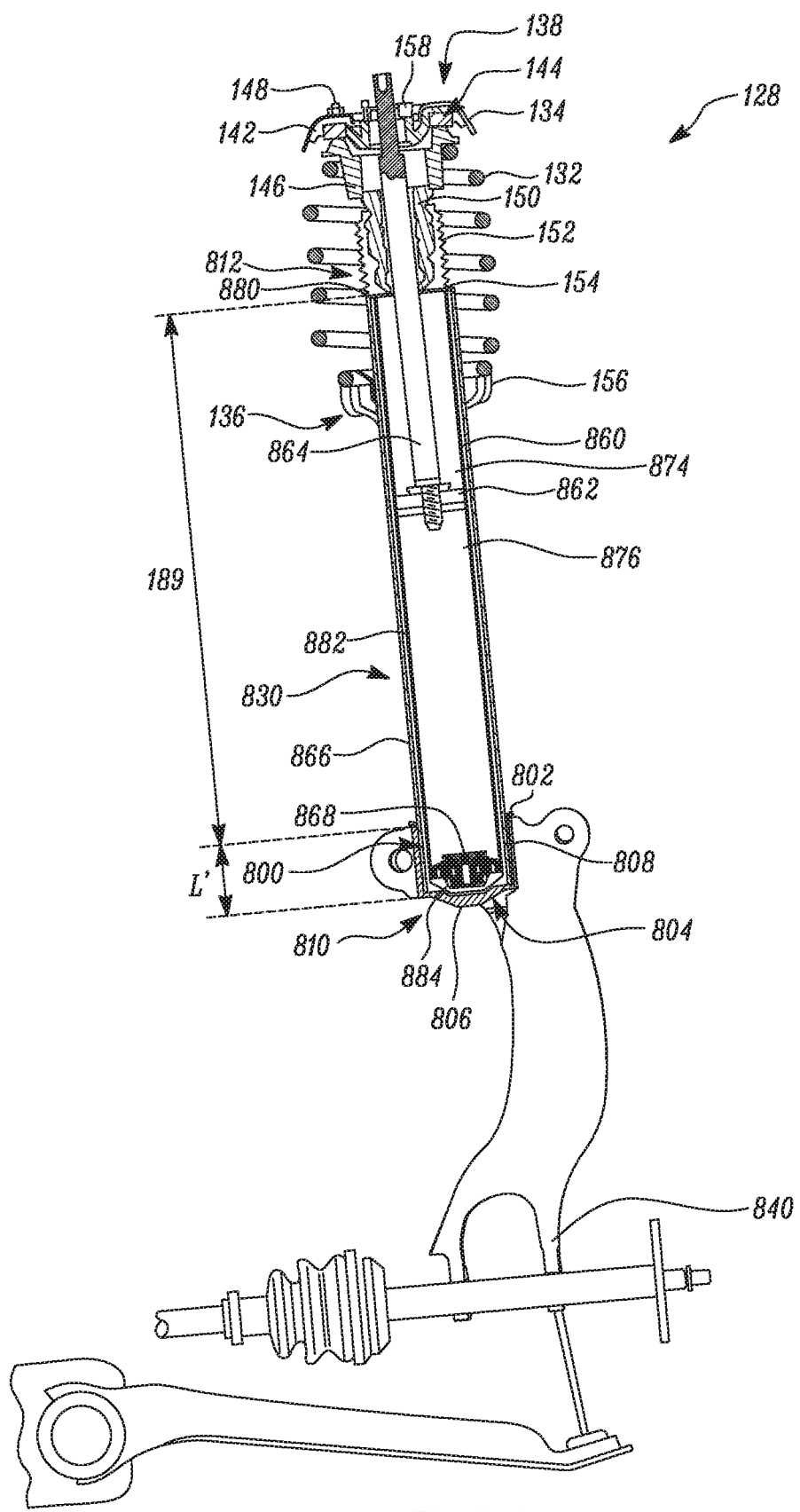
FIG. 8A is a schematic illustration of the corner assembly that incorporates a double-tube damper associated with the suspension system of FIG. 1, according to an aspect of the present disclosure.
Figure 8B:
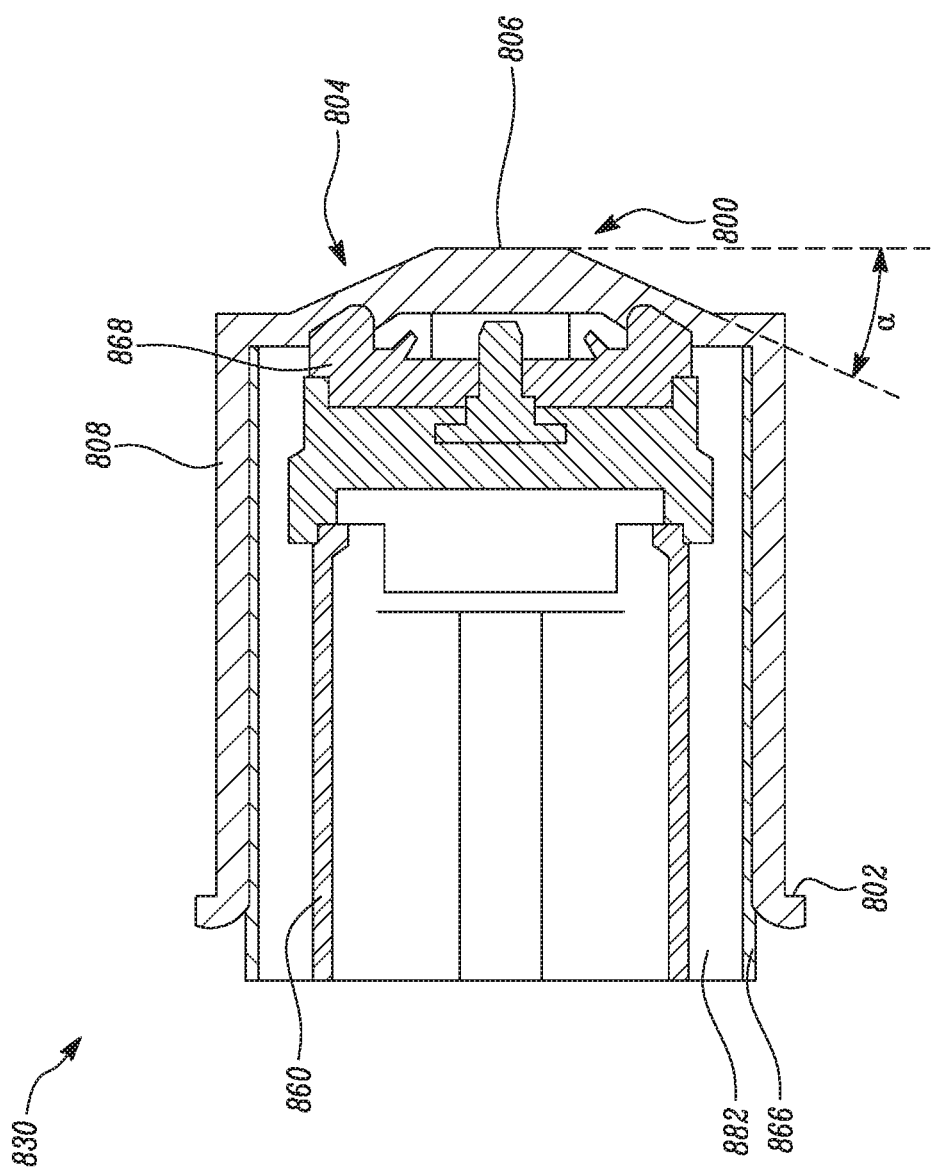
FIG. 8B is a schematic illustration around a first end of the double-tube damper as shown in FIG. 8A, according to an aspect of the present disclosure.

FIGS. 8A and 8B illustrate the corner assembly 128 which has a double-tube damper 830. The damper 830 includes a pressure tube 860, a piston assembly 862, a piston rod 864, a reserve tube 866 and a base valve 868. As illustrated, the damper 830 has similar arrangement of components between the top mount assembly 138 and the lower spring seat 156 as explained with reference to the damper 130 in FIG. 2. In the illustrated embodiment of FIGS. 8A and 8B, the reserve tube 866 is the damper tube that may require reinforcement.

The damper 830 includes the pressure tube 860. The damper 830 includes the piston assembly 862 slidably received within the pressure tube 860. The damper 830 includes the base valve 868 disposed at an end of the pressure tube 860. The damper 830 includes the reserve tube 866 disposed around the pressure tube 860. The reserve tube 866 includes a first end 810 proximate the base valve 868 and a second end 812 distal to the base valve 868. The damper 830 includes a base member 800. The base member 800 includes a cup portion 806 at least partially enclosing the first end 810 of the reserve tube 866, and a sleeve portion 808 extending from and integral with the cup portion 806. The sleeve portion 808 surrounds a length L' of the reserve tube 866. The sleeve portion 808 is attached to the reserve tube 866. Further, the damper 830 includes a knuckle 840 engaged with the sleeve portion 808 such that the sleeve portion 808 is disposed between the knuckle 840 and the reserve tube 866.

The reserve tube 866 surrounds the pressure tube 860 to define a fluid reservoir chamber 882 located between the pressure tube 860 and the reserve tube 866. The first end 810 of the reserve tube 866 is closed by an end cap 884. While the end cap 884 is illustrated as a separate component, it is within the scope of the present disclosure to have the end cap 884 integral with the reserve tube 866. The second end 812 of the reserve tube 866 is attached to an upper end cap 880. The first end 810 of the reserve tube 866 defines the length L' which interfaces with the knuckle 840. The remaining length of the reserve tube 866 defines a non-reinforced portion 189. The base valve 868 is disposed between the lower working chamber 876 and the reservoir chamber 882 to control the flow of fluid between the lower working chamber 876 and the reservoir chamber 882. When the damper 830 extends in length, an additional volume of fluid is needed in the lower working chamber 876 due to the "rod volume" concept. Thus, fluid will flow from the reservoir chamber 882 to the lower working chamber 876 through the base valve 868 and then to an upper working chamber 874 through valves of the piston assembly 862. When the damper 830 compresses in length, an excess of fluid must be removed from the lower working chamber 876 due to the "rod volume" concept. Thus, fluid will flow from the lower working chamber 876 to the reservoir chamber 882 through the base valve 868.

Referring to FIG. 8B, the cup portion 806 of the base member 800 is illustrated with an angled region 804 configured to accommodate the base valve 868. An angle α, length and other dimensions of the angled region 804 can generally depend on various factors such as accommodation requirement of the base valve 868. As illustrated in the present figure, the sleeve portion 808 includes a lip 802 disposed at an end distal to the cup portion 806. The lip 802 serves to engage the sleeve portion 808 with the knuckle 840 and limit any inadvertent movement of the knuckle 840 engaging with the sleeve portion 808 of the base member 800.

Figure 9:
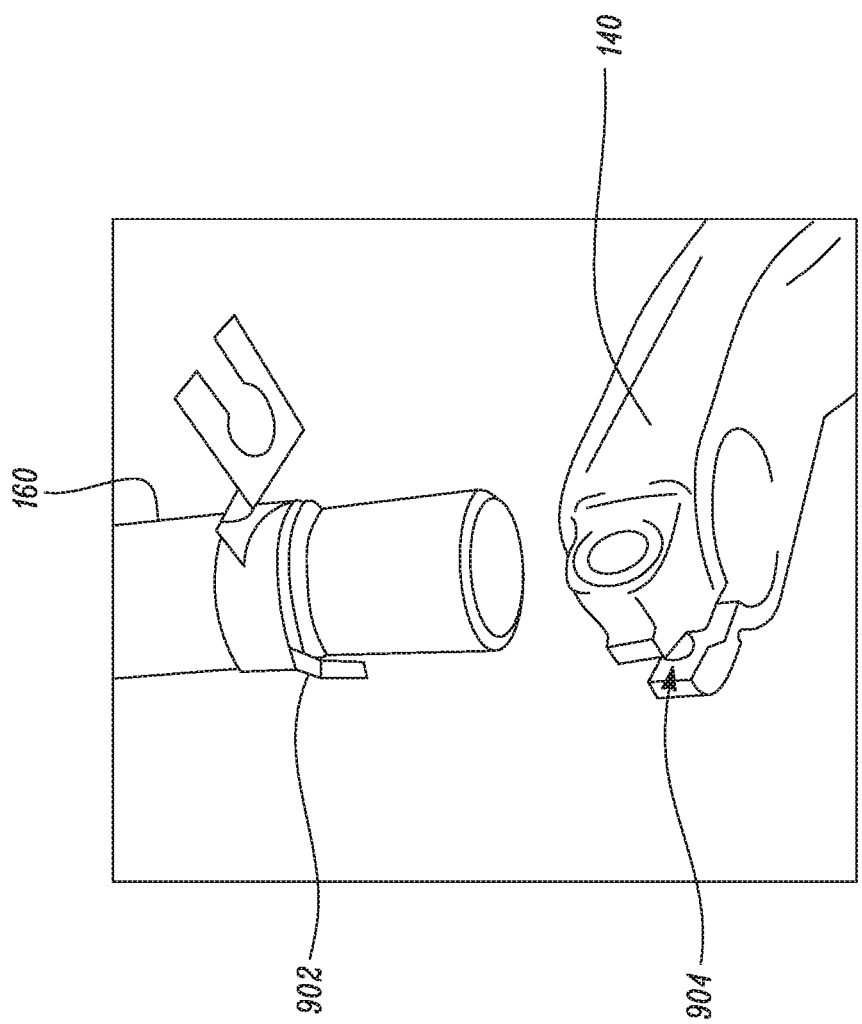
FIG. 9 is an illustration of the pressure tube and the knuckle during assembly, according to an aspect of the present disclosure.
Figure 10:
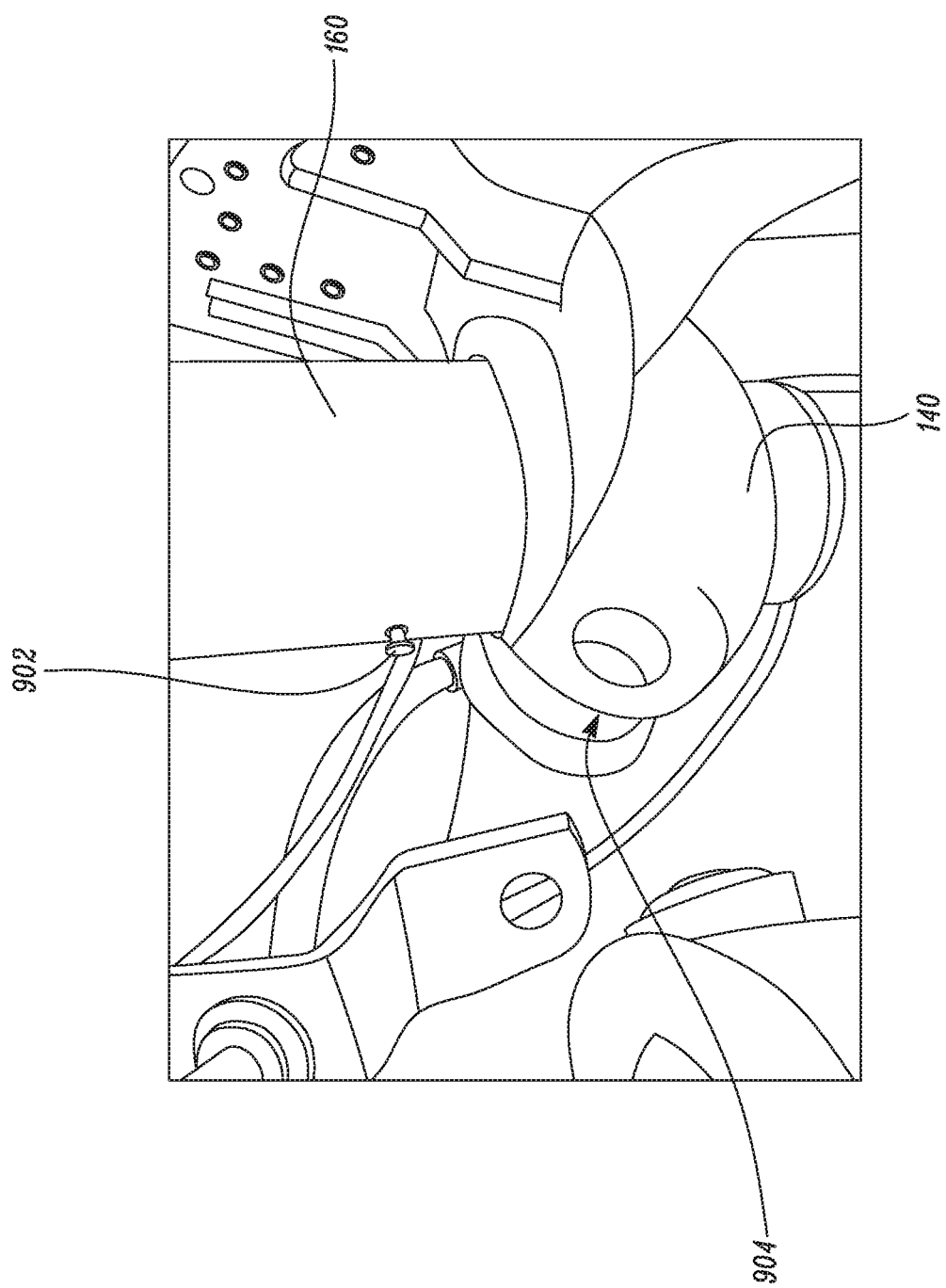
FIG. 10 is an illustration with the pressure tube and the knuckle during assembly, according to an aspect of the present disclosure.

FIGS. 9 and 10 illustrate the damper 130 having the base member 200 during assembly with the knuckle 140. As show in FIG. 9, the sleeve portion 208 includes a projection 902, and the knuckle 140 defines an opening 904 that at least partially receives the projection 902 of the sleeve portion 208. In another embodiment, as shown in FIG. 10, the projection of the sleeve portion 208 includes a pin 906.

Figure 11:
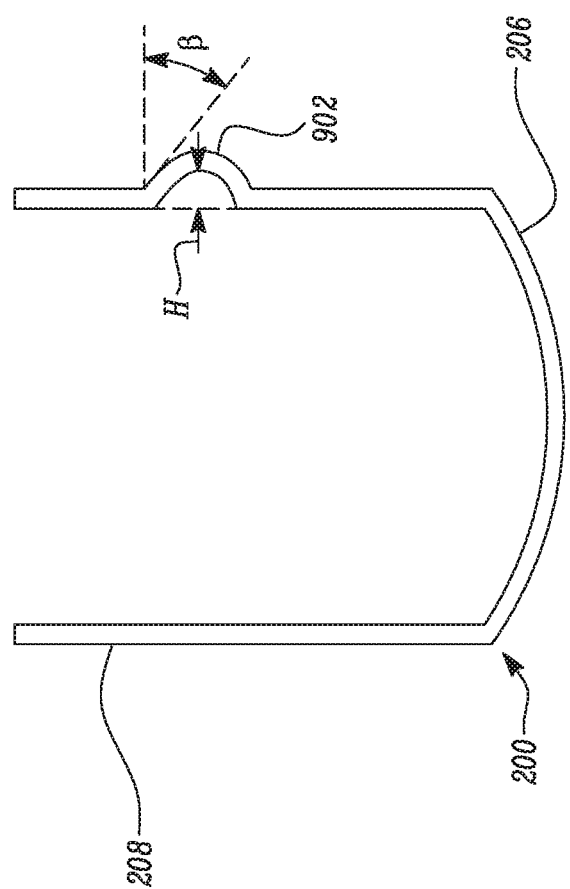
FIG. 11 is a schematic illustration of the base member having a dent, according to an aspect of the present disclosure.

In yet another embodiment, as illustrated in FIG. 11, the projection of the sleeve portion 208 includes a dent 908. The dent 908 can be designed in accordance with fitment requirements of the sleeve portion 208 so that the dent 908 can desirably engage with the opening 904 (shown in FIG. 9) of the knuckle 140. In some embodiments, a height H, an angle β, a shape, and a position of the dent 908 can be dependent on the formability of the deep drawing material of the base member 200.

Figure 12:
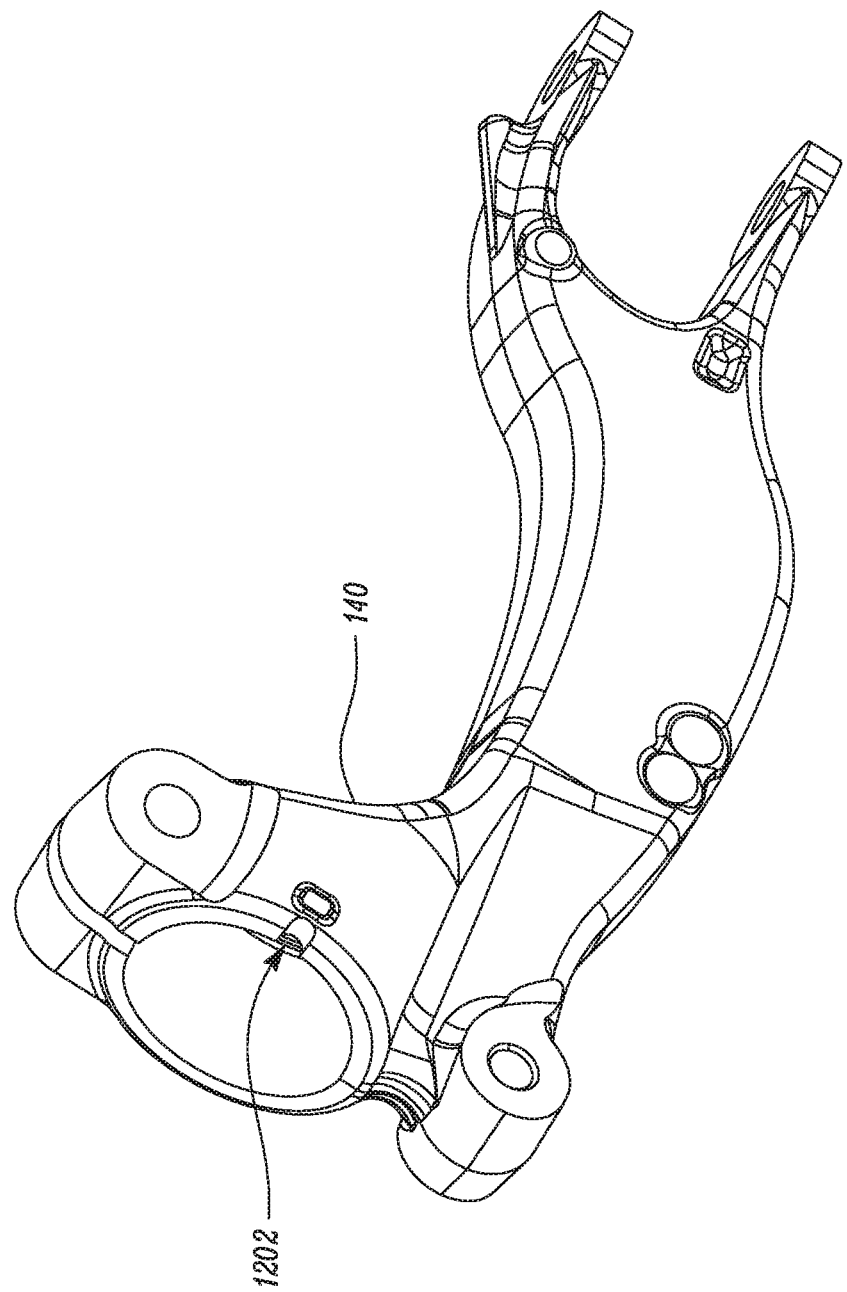
FIG. 12 is a schematic illustration of the knuckle having an opening, according to an aspect of the present disclosure.

FIG. 12 illustrates the knuckle 140 including an opening 1202 according to an aspect of the present disclosure. The opening 1202 can engage with the projection 902, the pin 906 and/or the dent 908. The present disclosure illustrates different embodiments of the opening 904, 1202 of the knuckle 140, as illustrated in FIGS. 9, 10, and 12 while actual implementation of the opening of the knuckle 140 can depend upon application requirements.

The base member 200, 800 of the present disclosure provide various advantages related to implementation and cost benefits over conventional arrangements which involve a sleeve, a tube (say a pressure tube/reserve tube), and welding wire. For instance, the conventional arrangements involved arc welding of a sleeve to a tube with the use of the welding wire. This process can lead to undesirable costs and peripherals related to the welding. Further, in conventional arrangements, there is a requirement of hot closing of the tube which has been eliminated due to the integrated design of the base member 200, 800 of the present disclosure. Instead, the base member 200, 800 can be directly welded to the damper tube (i.e., the reserve tube 866 or the pressure tube 160) by laser welding.

In some embodiments, the material for the base member 200, 800 can be a deformative material, such as high ductility steel grade with low yield strength, to accommodate forces exerted from the knuckle 140 (say squeezing between the reserve tube 866/pressure tube 160 and the knuckle 140). Alternatively, the base member 200, 800 can be made of a strong or rigid material, such as high strength steel grade, so that it does not plastically deforms and transfers the force to the reserve tube 866/pressure tube 160 for increasing the friction.

While aspects of the present disclosure have been particularly shown and described with reference to the embodiments above, it will be understood by those skilled in the art that various additional embodiments can be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A damper comprising:
   a damper tube comprising a first end and a second end opposite to the first end;
   a base member comprising:
      a cup portion at least partially enclosing the first end of the damper tube and comprising an aperture in the cup portion; and
      a sleeve portion extending from and integral with the cup portion, the sleeve portion surrounding a length of the damper tube, wherein the sleeve portion is attached to the damper tube; and a knuckle engaged with the sleeve portion such that the sleeve portion is disposed between the knuckle and the damper tube, the knuckle comprising a contact area on an inside region of the knuckle for engagement with the cup portion such that the knuckle remains in contact with the cup portion and the knuckle does not cover the aperture in the cup portion.

2. The damper of claim 1, wherein the sleeve extends over a portion of the damper and the knuckle extends over only a portion of the sleeve such that the sleeve extends beyond the length of the knuckle.

3. The damper of claim 2, wherein the sleeve is welded to the damper.

4. The damper of claim 3, wherein the knuckle is welded to the sleeve.

5. The damper of claim 2, wherein the cup portion comprises an aperture and the contact area of the knuckle surrounds and is adjacent to the aperture.

6. The damper of claim 1, wherein the sleeve portion further comprises a projection, and wherein the knuckle defines an opening that at least partially receives the projection of the sleeve portion.

7. The damper of claim 6, wherein the projection of the sleeve portion is a pin or a dent.

8. The damper of claim 1, wherein the sleeve portion further comprises a lip disposed at an end distal to the cup portion.

9. The damper of claim 1, wherein the cup portion further defines a groove disposed adjacent to the sleeve portion.

10. The damper of claim 1, wherein the damper tube is a pressure tube.

11. The damper of claim 1, wherein the damper further comprises a pressure tube and a base valve disposed at an end of the pressure tube, and wherein the damper tube is a reserve tube disposed around the pressure tube, and wherein the cup portion of the base member further comprises an angled region configured to accommodate the base valve.

12. The damper of claim 1, wherein the sleeve portion is attached to the damper tube by at least one of welding, press-fitting, crimping, and gluing.

13. The damper of claim 1, wherein the base member comprises a pair of half-shells welded to each other.

14. A damper comprising:
a pressure tube comprising a first end and a second end opposite to the first end;
a piston assembly slidably received within the pressure tube;
a base member comprising:
a cup portion at least partially enclosing the first end of the pressure tube and comprising an aperture in the cup portion; and
a sleeve portion extending from and integral with the cup portion, the sleeve portion surrounding a length of the pressure tube, wherein the sleeve portion is attached to the pressure tube; and
a knuckle engaged with the sleeve portion such that the sleeve portion is disposed between the knuckle and the pressure tube, the knuckle comprising a contact area on an inside region of the knuckle for engagement with the cup portion such that the knuckle remains in contact with the cup portion and the knuckle does not cover the aperture in the cup portion.

15. The damper of claim 14, wherein the sleeve portion further comprises a projection, and wherein the knuckle defines an opening that at least partially receives the projection of the sleeve portion.

16. The damper of claim 15, wherein the projection of the sleeve portion is a pin or a dent.

17. The damper of claim 14, wherein the cup portion further defines a groove disposed adjacent to the sleeve portion.

18. The damper of claim 14, wherein the sleeve portion is attached to the pressure tube by at least one of welding, press-fitting, crimping, and gluing.

* * * * *